United States Patent

[11] 3,595,096

[72] Inventors Karl Adler
Grenchen;
Georges Ducommun, Feldbrunnen, both of, Switzerland
[21] Appl. No. 868,019
[22] Filed Oct. 21, 1969
[45] Patented July 27, 1971
[73] Assignee Biviator S. A.
Geneva, Switzerland

[54] DRILL-SPINDLE DRIVE FOR HIGH SPEEDS
5 Claims, 2 Drawing Figs.
[52] U.S. Cl. .................................................. 74/206, 74/199
[51] Int. Cl. ...................................................F16h 13/02, F16h 15/08
[50] Field of Search .......................................... 74/206, 202, 199

[56] References Cited
UNITED STATES PATENTS
2,850,338  9/1958  Kopczynski .................. 74/206 X
3,264,814  8/1966  Kuster et al. .................. 74/206 X
3,380,312  4/1968  Barske ........................... 74/206

Primary Examiner—Leonard H. Gerin
Attorney—Imirie and Smiley

ABSTRACT: A drill-spindle drive for high speeds, wherein the spindle is held between supporting and driving rollers, radial vibration of the spindle being avoided and high precision obtained by selecting the angle between the normals at the points of contact of each two corresponding rollers of the supporting and driving roller system with the drill spindle at most 100°.

INVENTORS
KARL ADLER
GEORGES DUCOMMUN

BY Imirie, Smiley, Snyder & Butrum
ATTYS.

DRILL-SPINDLE DRIVE FOR HIGH SPEEDS

The invention relates to a drill-spindle drive for high speeds, using supporting and driving rollers.

Hitherto drill-spindle drives have been used with bearing rollers for pressing the drill spindle against magnetized drive rollers. Such drill spindles may be subjected to considerable vibrations which are still further increased by the arrangement of the roller systems, depending on the size of the angle enclosed by the tangents of the rollers at the points of contact with the spindle.

Other embodiments of a drill-spindle drive have a spindle which is held between a resiliently mounted friction wheel and a pair of rigidly mounted friction wheels, the axial distance between the pair of friction wheels being smaller that the sum of their radii.

In these embodiments the best angle at the points of contact of the spindle to obtain a drive substantially free from vibrations, has not been clearly established.

In accordance with the invention the angle between the tangents at the points of contact of each two corresponding rollers of the supporting and driving roller system with the drill spindle is in the order of 100° or less, at least one guide device such as a pressing roller or yoke for pressing the drill spindle against the roller system being provided.

Figure 1:
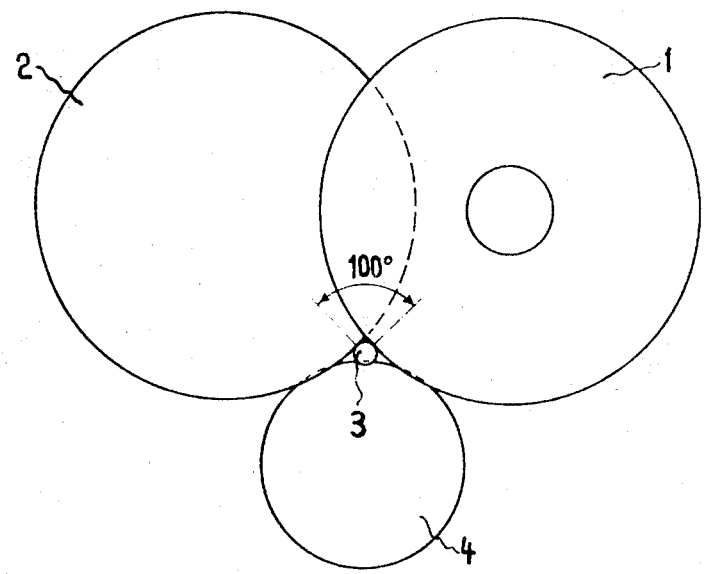
Figure 2:
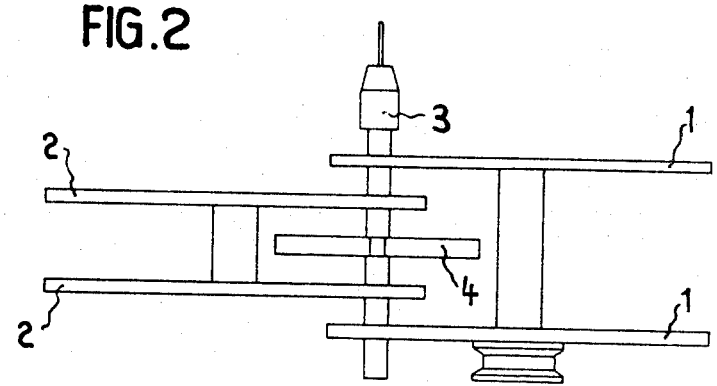

Further features of the invention are shown in the accompanying drawings, in which, FIG. 1 is a side view of a drill arrangement, and
FIG. 2 is a plan view of the arrangement of FIG. 1.

At least two rollers 1 are mounted on a driving shaft, and are located opposite a second roller system 2, the rollers of both systems being offset relative to one another in an axial direction. A drill spindle 3 is held in contact with these roller systems from below by a pressing roller 4 urging the drill spindle against the other rollers. The angle between the normals of each two corresponding upper rollers at the points of contact with the drill spindle is 100°. However, this angle may also be less than 100°. In a preferred embodiment, this angle may be 80°, that is the angle between tangents to the spindle in the points of contact is 100°. Angles in this range enable the vibrations which occur due to the rolling engagement of the boring spindle with the roller systems to be kept to a minimum whilst allowing the pressing roller 4 to provide adequate location of the drill spindle. Such a drill system provides accurate holes both with regard to shape and dimensions.

It is, of course, also possible to locate the boring spindle above the roller systems. Instead of a roller, a stationary yoke may be used to press the spindle against the roller systems. Devices may also be provided on the spindle to limit axial movement thereof.

What we claim is:

1. A drill-spindle drive for high speeds, having two parallel shafts, supporting rollers on one of said shafts and driving rollers on the other of said shafts, said supporting rollers and driving rollers being axially offset relatively to each other and overlapping each other, a drill spindle of substantially smaller diameter than said supporting rollers and driving rollers, rotatably supported on said supporting rollers and driving rollers, the angle between the normals at the points of contact of each two corresponding rollers of the supporting and driving roller system with the drill spindle being in the order of 100° or less, and at least one guide device for pressing the drill spindle against the roller systems being provided.

2. A drill-spindle drive according to claim 1, wherein the guide device is a pressing roller.

3. A drill-spindle drive according to claim 1, wherein said angle is at least approximately 80°.

4. A drill-spindle drive according to claim 1, wherein the guide device is a pressing yoke.

5. A drill-spindle drive for high speeds, comprising two parallel shafts, a pair of rollers on each of said shafts, the rollers of both pairs being axially offset relatively to each other and the distance between said shafts and radii of said rollers being so designed that said rollers overlap, a drill spindle frictionally and rotatably engaging said rollers and maintained in contact with said rollers by guide means urging it against said rollers, the angle between the points of contact of said spindle with rollers mounted on different of said shafts being in the order of 100° or less, and means for driving said spindle from said rollers.